US009784483B2

(12) United States Patent
Moors et al.

(10) Patent No.: US 9,784,483 B2
(45) Date of Patent: Oct. 10, 2017

(54) USE OF ROTATING MAGNETIC SHIELDING SYSTEM FOR A MAGNETIC COOLING DEVICE

(71) Applicant: BASF SE, Ludwigshafen (DE)

(72) Inventors: Juergen Moors, Neustadt (DE); Wilfried Hermes, Karlsruhe (DE)

(73) Assignee: BASF SE, Ludwigshafen (DE)

( * ) Notice: Subject to any disclaimer, the term of this patent is extended or adjusted under 35 U.S.C. 154(b) by 86 days.

(21) Appl. No.: 14/787,704

(22) PCT Filed: May 6, 2014

(86) PCT No.: PCT/EP2014/059195
§ 371 (c)(1),
(2) Date: Oct. 28, 2015

(87) PCT Pub. No.: WO2014/180822
PCT Pub. Date: Nov. 13, 2014

(65) Prior Publication Data
US 2016/0069596 A1 Mar. 10, 2016

(30) Foreign Application Priority Data

May 8, 2013 (EP) .................................... 13166934

(51) Int. Cl.
*F25B 21/00* (2006.01)
(52) U.S. Cl.
CPC ........ *F25B 21/00* (2013.01); *F25B 2321/002* (2013.01); *F25B 2321/0021* (2013.01); *F25B 2321/0023* (2013.01); *Y02B 30/66* (2013.01)
(58) Field of Classification Search
CPC ................................ F25B 21/00; Y02B 30/66
(Continued)

(56) References Cited

U.S. PATENT DOCUMENTS 5,156,003 A 10/1992 Yoshiro et al.
5,209,068 A 5/1993 Saji et al.
(Continued)

FOREIGN PATENT DOCUMENTS

EP 0 487 130 A1 5/1992
EP 0 496 530 A1 7/1992
(Continued)

OTHER PUBLICATIONS

International Search Report Issued Jun. 27, 2014 in PCT/EP14/059195 Filed May 6, 2014.
(Continued)

*Primary Examiner* — Melvin Jones
(74) *Attorney, Agent, or Firm* — Oblon, McClelland, Maier & Neustadt, L.L.P.

(57) ABSTRACT

A magnetocaloric regenerator unit comprising (A) at least one magnetocaloric material unit having a higher temperature hot side and a lower temperature cold side during operation, wherein the magnetocaloric material unit contains at least one magnetocaloric material, (B) at least one magnetic unit for producing a magnetic field over the magnetocaloric material contained in the magnetocaloric material unit, (C) at least one magnetic shielding comprising at least one window wherein the at least one magnetic shielding is mounted flexible to allow movement of the magnetic shielding between at least one first position and at least one second position thereby insulating the magnetocaloric material contained in the magnetocaloric material unit from the magnetic field when the magnetic shielding is in a first position and allowing the magnetic field to act on the magnetocaloric material through the at least one window when the magnetic shielding is in a second position.

13 Claims, 4 Drawing Sheets

(58) Field of Classification Search
USPC .......................................................... 62/3.1
See application file for complete search history.

(56) References Cited

U.S. PATENT DOCUMENTS

| | | | |
|---|---|---|---|
| 6,202,926 B1* | 3/2001 | Ito | G06K 19/06196 |
| | | | 235/380 |
| 6,526,759 B2* | 3/2003 | Zimm | F25B 21/00 |
| | | | 62/3.1 |
| 6,810,584 B2* | 11/2004 | Kamei | B29C 61/0625 |
| | | | 29/825 |
| 7,596,955 B2* | 10/2009 | Muller | F25B 21/00 |
| | | | 62/3.1 |
| 7,897,898 B2 | 3/2011 | Muller et al. | |
| 2004/0093877 A1 | 5/2004 | Wada et al. | |

FOREIGN PATENT DOCUMENTS

| | | |
|---|---|---|
| JP | 2006-308197 A | 11/2006 |
| WO | 03/012801 A1 | 2/2003 |
| WO | 2004/068512 A1 | 8/2004 |
| WO | 2011/083446 A1 | 7/2011 |
| WO | 2011/111004 A1 | 9/2011 |

OTHER PUBLICATIONS

Written Opinion of the International Searching Authority Issued Jun. 27, 2014 in PCT/EP14/059195 Filed May 6, 2014.
Written Opinion of the International Searching Authority Issued Apr. 20, 2015 in PCT/EP14/059195 Filed May 6, 2014.
International Preliminary Report on Patentability issued Aug. 25, 2015 in PCT/EP14/059195 Filed May 6, 2014.

* cited by examiner

USE OF ROTATING MAGNETIC SHIELDING SYSTEM FOR A MAGNETIC COOLING DEVICE

The present invention relates to a magnetocaloric regenerator unit comprising (A) at least one magnetocaloric material unit having a higher temperature hot side and a lower temperature cold side during operation, wherein the magnetocaloric material unit contains at least one magnetocaloric material,
(B) at least one magnetic unit for producing a magnetic field over the magnetocaloric material contained in the magnetocaloric material unit,
(C) at least one magnetic shielding comprising at least one window wherein the at least one magnetic shielding is mounted flexible to allow movement of the magnetic shielding between at least one first position and at least one second position thereby insulating the magnetocaloric material contained in the magnetocaloric material unit from the magnetic field when the magnetic shielding is in a first position and allowing the magnetic field to act on the magnetocaloric material through the at least one window when the magnetic shielding is in a second position.

In a material exhibiting a magnetocaloric effect, the alignment of randomly aligned magnetic moments by an external magnetic field leads to heating of the material. This alignment is also named magnetocaloric phase transition which occurs at the so called Curie temperature. The heat emerging upon the magnetocaloric phase transition can be removed from the magnetocaloric material to the surrounding atmosphere by a heat transfer medium. When the magnetic field is then switched off or removed, the magnetic moments revert back to a random arrangement, which leads to cooling of the material below ambient temperature. This effect can be exploited in heat pumps or for cooling purposes; see also Nature, Vol. 415, Jan. 10, 2002, pages 150 to 152. Typically, a heat transfer medium such as water is used for heat removal from the magnetocaloric material. The magnetic cooling constitutes an alternative to the known vapor circulation cooling methods.

One essential issue in exploiting the magnetocaloric effect for cooling purposes or for heat pumps is the magnetic field acting on the magnetocaloric material and its variation during operation. Usually the magnetic field is generated by a permanent magnet, electromagnet or in rare cases a superconducting magnet. The variation of the magnetic field required for operating a magnetocaloric device is usually achieved by moving the source of the magnetic field, e.g. the permanent magnet back and forth in respect to the stationary magnetocaloric material or vice a versa by moving the magnetocaloric material into and out of the magnet field generated by a stationary magnet. As a result the magnetocaloric material exerts a varying magnetic field and undergoes the magnetocaloric phase transition. For an efficient operation of a magnetocaloric device the magnetic field has to be varied not only once but regularly, e.g. with a frequency of 1 Hz up to 10 Hz.

A magnetic refrigerator wherein the magnetocaloric material is moved into and out of the magnetic field is described by Zimm, C. et al., International Journal of Refrigeration 29 (2006), pages 1302 to 1306 or by US 2004/0093877 A1. An example of a magnetic refrigerator using rotating magnets can be found in Okamura, T. et al., International Journal of Refrigeration 29 (2006), pages 1337 to 1331.

Both the generator of the magnetic field and the magnetocaloric material are comparatively heavy and in consequence a lot of energy for moving either the generator of the magnetic field or the magnetocaloric material is required. Both the generator of the magnetic field and the magnetocaloric material are valuable components of magnetocaloric devices which should be treated carefully during operation to allow a long lifetime of the devices. In case of moving the magnetocaloric material, the fluid-tubes attached for the heat exchange medium a sensible issue which are difficult to establish.

U.S. Pat. No. 7,897,898 B2 describes a heat generator comprising at least one magnetocaloric material, at least one magnetic element for generating a magnetic field acting on the magnetocaloric material and at least one magnetic modulation means for varying the magnetic field received by the at least one magnetocaloric material wherein the magnetic modulation means may increase the magnetic field or may decrease the magnetic field. The magnetic modulation means are displaceable between an active position and an inactive position. In the active position the magnetic modulation means are close to the magnetocaloric material, in the inactive position they are distanced from the magnetocaloric material and have no effect on the magnetocaloric material. The magnetic modulation means described are complex structures of C- or U-shape.

U.S. Pat. No. 5,156,003 refers to a magnetic refrigerator comprising a magnet, a magnetic working material, a tube-shaped superconducting magnetic shield and a means for reciprocatively moving the superconducting magnetic shield. The magnetic working material is placed within the magnetic field generated by the magnet and magnetized. The superconducting tube shaped magnetic shield is introduced into the magnetic field thereby accommodating the magnetic working material in the hollow section of the superconducting magnetic shield and insulating the magnetic working material from the magnetic field leading to demagnetization of the magnetic working material.

The devices exploiting the magnetocaloric effect by varying the magnetic field acting on the magnetocaloric materials are still very complex entities. In general simplification of the whole system is desirable to allow cheaper and simpler construction of the magnetocaloric devices.

These objects are achieved by the inventive magnetocaloric regenerator unit comprising (A) at least one magnetocaloric material unit having a higher temperature hot side and a lower temperature cold side during operation, wherein the magnetocaloric material unit contains at least one magnetocaloric material,
(B) at least one magnetic unit for producing a magnetic field over the magnetocaloric material contained in the magnetocaloric material unit,
(C) at least one magnetic shielding comprising at least one window wherein the at least one magnetic shielding is mounted flexible to allow movement of the magnetic shielding between at least one first position and at least one second position thereby insulating the magnetocaloric material contained in the magnetocaloric material unit from the magnetic field when the magnetic shielding is in a first position and allowing the magnetic field to act on the magnetocaloric material through the at least one window when the magnetic shielding is in a second position.

The objects are further achieved by a process for operating a magnetocaloric device containing at least one magnetocaloric material wherein the varying magnetic field used to exploit the magnetocaloric effect is produced by moving at least one magnetic shielding comprising at least one window between at least two different positions thereby insulating the magnetocaloric material contained in the magnetocaloric material unit from the magnetic field when the magnetic shielding is in a first position and allowing the magnetic field to act on the magnetocaloric material when the magnetic shielding is in a second position. They are further achived by refrigeration systems, climate control units, and heat pumps comprising the inventive magnetocaloric regenerator unit.

The inventive magnetocaloric regenerator unit constitutes a simplification of a magnetocaloric system with the potential to build a cheaper and more compact system. It is possible to achieve higher rotating frequencies compared to systems comprising a rotating magnet or magnetocaloric material or heavy and complex magnetic shieldings. The inventive magnetocaloric regenerator comprising the simplified magnetic shielding may lead to a cooling system which can cool down faster. Less electrical energy is required to drive the magnetic cooling cycle since the magnetic shielding used according to the invention is much lighter than the magnet or the magnetocaloric material or beds with magnetocaloric material. This is in particular important since a magnetocaloric device contains usually more than one magnetocaloric material to cover a broader temperature span, i.e. usually a magnetocaloric device contains a plurality of different magnetocaloric materials leading to a larger and heavier device. The system may be downsized due to a smaller and easier rotating machine. The lifetime of the complete device is increased since critical and easily damageable components like the magnetocaloric material or beds with magnetocaloric materials or complex magnetic shieldings are not moved. Due to the simplified variation of the magnetic field the inventive magnetic regenerator opens the possibility of a large variety of configurations which were not available with the systems comprising rotating magnets or magnetocaloric materials or beds of magnetocaloric materials.

In the following the invention is explained in detail.

The inventive magnetocaloric regenerator unit comprises at least one magnetocaloric material unit (A), also referred to as "magnetocaloric unit". During operation this unit has a higher temperature hot side ("hot side") and a lower temperature cold side ("cold side") and contains at least one magnetocaloric material. Preferably the magnetocaloric material unit contains at least 2 up to 100 different magnetocaloric materials with different Curie temperatures. The number of magnetocaloric materials is guided by the practical requirements and apparatus features. A relatively large number of different magnetocaloric materials can exploit a relatively wide temperature range. More preferred a magnetocaloric material unit used in the inventive magnetocaloric regenerator unit contains at least 3 up to 100, even more preferred at least 5 up to 100 and in particular at least 10 up to 100 different magnetocaloric materials with different Curie temperatures. Such arrangement of different magnetocaloric materials with different Curie temperatures is hereinafter also referred to as magnetocaloric cascade.

The different magnetocaloric materials with different Curie temperatures are arranged in succession by descending Curie temperature, i.e. the magnetocaloric material having the highest Curie temperature is arranged at one end of the magnetocaloric material unit, the magnetocaloric material having the second highest Curie temperature is placed adjacently and so on, the magnetocaloric material having the lowest Curie temperature is placed at the opposite end of the magnetocaloric material unit. The end of the magnetocaloric material unit where the magnetocaloric material with the highest Curie temperature is located corresponds to the hot side of the magnetocaloric material unit, the end of the magnetocaloric material unit where the magnetocaloric material with the lowest Curie temperature is located, corresponds to the cold side of the magnetocaloric material unit. It is preferred if the difference in the Curie temperatures of two adjacent magnetocaloric materials with different Curie temperatures is 0.5 to 6 K, more preferred 0.5 to 4 K and in particular preferred 0.5 to 2.5 K.

The total difference in the Curie temperatures between the material with the highest Curie temperature and the material with the lowest Curie temperature is preferably 3 to 80 K, more preferably 8 to 80 K. For example, in a combination of five different materials with a Curie temperature difference of 2 K between any two adjacent materials in the cascade, a temperature range of 8 K may arise. Use of a plurality of materials with different Curie temperatures makes it possible to achieve a significantly greater temperature range than is possible using a single magnetocaloric material.

Magnetocaloric materials may show a thermal hysteresis at the magnetic phase transition. According to the invention, magnetocaloric materials are preferably used which have a low thermal hysteresis, e.g. of less than 5 K, more preferably of less than 3 K, especially preferred of less than 2 K.

The inventive magnetocaloric regenerator unit may comprise one, two or more magnetocaloric material units (A) which may be same or different. Usually the magnetic magnetocaloric regenerator unit comprises not more than 10 magnetocaloric material units which may be same or different.

The at least one magnetocaloric material unit (A) is usually thermally connected with a heat exchanger at the cold side of the magnetocaloric unit and with a heat exchanger at the hot side of the magnetocaloric unit. For this purpose a heat transfer medium may be pumped from the heat exchanger at the hot side of the magnetocaloric unit through the magnetocaloric unit to the heat exchanger at cold side of the magnetocaloric unit and vice versa. The pumping frequency is adjusted to the frequency of the variation of the magnetic field. When the magnetic field is acting on the magnetocaloric materials, the heat transfer medium is pumped through the magnetocaloric unit from the cold side to the hot side thereby transporting the heat generated by the magnetization of the magnetocaloric materials to the heat exchanger at the hot side of the magnetocaloric unit. When the magnetic field is removed the heat transfer medium is pumped through the magnetocaloric unit from the hot side to the cold side of the magnetocaloric unit thereby releasing heat to the magnetocaloric material having a lower temperature due to demagnetization. Suited heat transfer media are described below.

The inventive magnetocaloric regenerator unit further comprises at least one magnetic unit (B) for producing a magnetic field over the magnetocaloric material contained in the magnetocaloric material unit. The means for producing a magnetic field may be selected from permanent magnets, superconductive magnets and electromagnets, preferred are permanent magnets. Such means are known to the person skilled in the art. It is preferred if the magnetic field produced by the magnetic unit is 0.5 to 2.5 T.

The magnetic unit (B) may comprise one, two or more means for generating a magnetic field, and the inventive magnetocaloric regenerator unit may comprise one, two or more of such magnetic units (B). The at least one magnetic unit is arranged such that it produces a magnetic field over at least a part of magnetocaloric material contained in the magnetocaloric material unit when no magnetic shielding is placed within the magnetocaloric regenerator unit. Depending on the respective embodiment, one magnetic unit produces a magnetic field over one whole magnetocaloric material unit or over two or more magnetocaloric material units. It is also possible that several magnetic units are used wherein each magnetic unit produces a magnetic field for a part of a magnetocaloric material unit. Furthermore, several magnetic units and several magnetocaloric material units may be used.

The inventive magnetocaloric regenerator unit further comprises at least one magnetic shielding (C) which comprises at least one window mounted flexible to allow movement of the magnetic shielding between at least one first position and at least one second position thereby insulating the magnetocaloric material contained in the magnetocaloric material unit from the magnetic field when the magnetic shielding is in a first position and allowing the magnetic field to act on the magnetocaloric material through the at least one window when the magnetic shielding is in a second position.

The term "window" as used herein means an area free of magnetic shielding material but completely surrounded by the magnetic shielding material. If the magnetic shielding is in a second position, the magnetic field generated by the magnetic unit acts on the magnetocaloric material through this area free of magnetic shielding material. Since the window is completely surrounded by the magnetic shielding material the magnetic field lines are able to flow through the surrounding magnetic shielding material and no discontinuities of the magnetic field lines occur independently from the position of the shielding. The movement from a first position to a second position doesn't disturb the magnetic field lines or at least less than a complete removal of the magnetic shielding from the magnetic field and therefore requires less energy. Furthermore, this construction leads to high mechanical stability of the magnetic shielding. The windows may be of any shape suited, e.g. rectangular, spherical or ellipsoidal.

The terms "first position" and "second position" are intended to mean two different kinds of positions from a variety of possible positions. A position called "first position" is a working position of the magnetic shielding wherein the magnetic shielding insulates the magnetocaloric material or at least a part of it contained in the magnetocaloric material unit from the magnetic field. In this working position the magnetocaloric material is demagnetized and undergoes a phase transition leading to a temperature decrease of the magnetocaloric material. As will be seen later in the detailed description of different embodiment of the invention, it is possible that a magnetic shielding may take more than one working position wherein it is capable to insulate the magnetocaloric material or at least a part of it contained in the magnetocaloric material unit from the magnetic field resulting in a demagnetization of the magnetocaloric material which leads to a magnetocaloric phase transition and a temperature decrease of the magnetocaloric material. All working positions characterized by the demagnetization of the magnetocaloric material resulting in a magnetocaloric phase transition are included by the term "first positions".

Positions called "second positions" are working positions of the magnetic shielding wherein the shielding is positioned such that the magnetic field produced by the magnetic unit acts on the magnetocaloric material or at least a part of it contained in the at least one magnetocaloric material unit resulting in a magnetization of the magnetocaloric material which leads to a magnetocaloric phase transition and a temperature increase in the magnetocaloric material. As will be seen later in the detailed description of different embodiments of the invention, it is possible that a magnetic shielding may take more than one position wherein the magnetic field produced by the magnetic unit acts on the magnetocaloric material or at least a part of it contained in the magnetocaloric material unit from the magnetic field resulting in a magnetization of the magnetocaloric material leading to a magnetocaloric phase transition and a temperature increase in the magnetocaloric material. All working positions characterized by the magnetization of the magnetocaloric material resulting in a magnetocaloric phase transition and increase of the temperature in the magnetocaloric material are included by "second positions".

According to a preferred embodiment of the invention the magnetic shielding reduces the magnetic field produced by the magnetic unit by at least 90%, more preferred by at least 95% and in particular by at least 99%.

Preferably the magnetic shielding comprises at least one soft magnetic material selected from pure iron; iron-silicon alloys; iron-cobalt alloys; nickel alloys comprising nickel and at least one element selected from iron, copper, cobalt, molybdenum, chromium and manganese like permalloy, supermalloy, M 1040 and mu-metal; amorphous nickel-iron-based alloys and amorphous cobalt-based alloys. Such magnetic materials show high magnetic permeabilities. A detailed description of these materials can be found in W. Ervens and H. Wilmesmeier, Section 5 of "Magnetic Materials" in Ullmann's Encyclopedia of Industrial Chemistry, Vol. 122, pages 106 to 124 Wiley-VCH Verlag, Weinheim, 2012 (DOI: 10.1002/14356007.16_001). Permalloy, supermalloy, M 1040, and mu-metal are nickel based alloys being especially well suited as materials for magnetic shieldings. These alloys are described in detail in section 5.1.2.1 (pages 114 to 116) of the above cited reference.

The magnetic shielding used in the inventive magnetocaloric regenerator unit may comprise one or more soft magnetic materials. In one embodiment of the present invention the magnetic shielding comprises at least one layer of a first soft magnetic material and at least one layer of a second soft magnetic material achieving the saturation level at a higher value of the magnetic field than the first soft magnetic material. This has the advantage that even at high magnetic fields the magnetocaloric material is insulated efficiently from the magnetic field by the magnetic shielding. Preferably the at least one layer of a first soft magnetic material is mu-metal and the least one layer of a second soft magnetic material achieving the saturation level at a higher value of the magnetic field than the first soft magnetic material is iron.

The movement of the magnetic shielding may be rotational, lateral or pivoting. According to one embodiment of the invention the magnetic shielding is mounted flexible to allow lateral movement of the magnetic shielding. According to another embodiment of the invention the magnetic shielding is mounted flexible to allow rotational movement of the magnetic shielding. Rotational movement preferably means movement around a rotational axis of the magnetic shielding, since this allows a very even distribution of the occurring forces. The movement of the magnetic shielding may be continuous or stepwise.

The magnetic shielding may be in any suited shape, e.g. it may be in the form of a sheet, a flat plate or disk, a curved sheet, plate or disk, or may be a hollow body like a hollow cylinder or hollow cuboid.

Preferably the magnetic shielding has essentially the form of a hollow body, in particular the magnetic shielding has the form of a hollow body. "Hollow body" as used herein includes hollow bodies with and without open ends like hollow cuboids or hollow cylinders with open or closed ends. More preferred the magnetic shielding has the form of a hollow cylinder, in particular a hollow cylinder with open ends. The hollow cylinder may have a spherical or ellipsoidal base area.

According to a preferred embodiment of the present invention the magnetic shielding comprises at least two windows through which the magnetic field produced by the magnetic unit acts on the magnetocaloric material when the magnetic shielding is in a second position. If the magnetic shielding is in the form of a hollow body, it is preferred, if the at least two windows are on opposing sides of the magnetic shielding, more preferred the at least two windows are located in the lateral areas of the hollow body. Even more preferred the magnetic shielding comprises 2n of such windows with n being a natural positive number of at least 1, wherein each pair of windows is arranged on opposing sides of the magnetic shielding, in particular each pair of windows is arranged on opposing sides of the lateral areas of the magnetic shielding. It is especially preferred, if the magnetic shielding has essentially the form of a hollow cylinder with at least two windows on opposing sides in the lateral area of the hollow cylinder; wherein the magnetocaloric material is arranged within the hollow cylinder; and wherein the magnetic shielding together with the magnetocaloric material is arranged within the magnetic field produced by the magnetic unit. The base area of the hollow cylinder may be spherical or ellipsoidal. In particular, the magnetic shielding comprises 2n windows in the lateral area of the hollow cylinder with n being a natural positive number, wherein each pair of windows is arranged on opposing sides of the magnetic shielding. An example for such an embodiment of the present invention is shown in FIG. 1a to c.

Figure 1A:
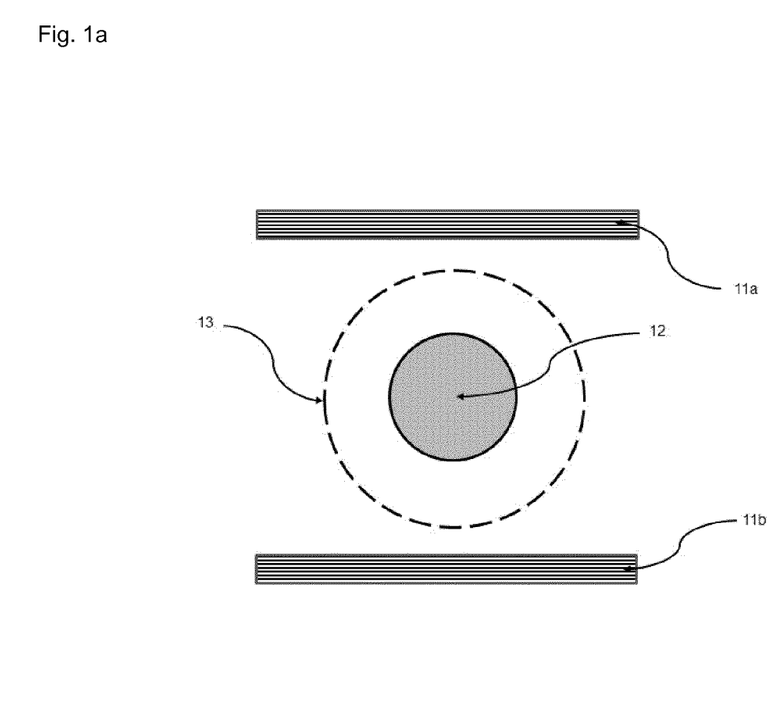
Figure 1B:
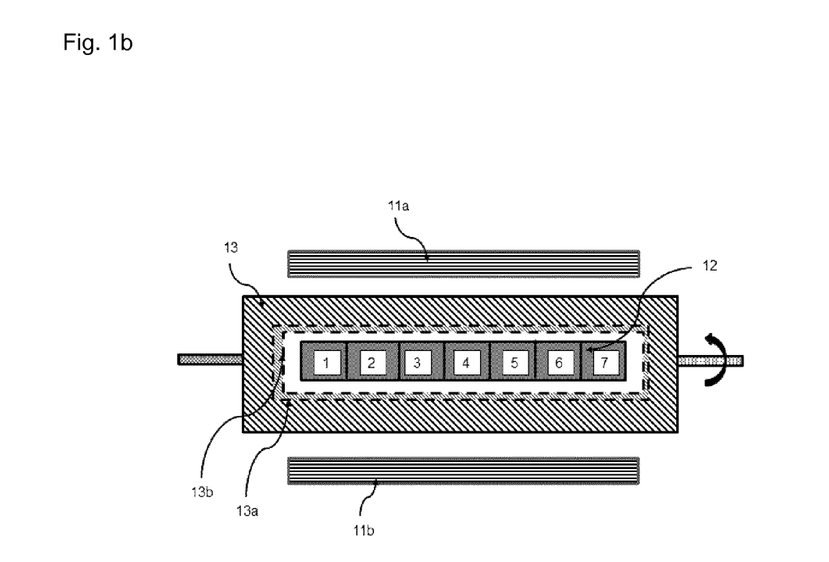
Figure 1C:
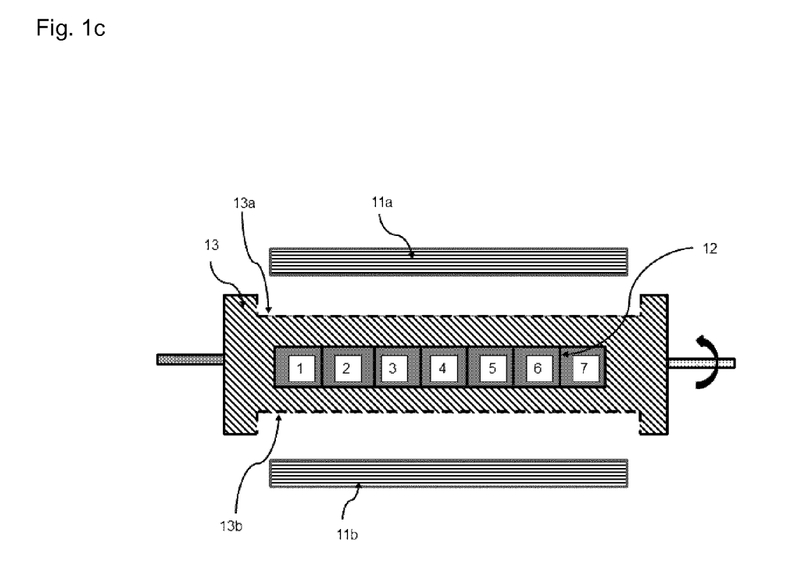

FIG. 1a to c show an inventive magnetocaloric regenerator unit comprising a magnetic unit having a positive pole (11a) and a negative pole (11b). A magnetic shielding (13) in form of a hollow cylinder with spherical base area comprising two rectangular windows (13a) and (13b) on opposing sides in the lateral area of the hollow cylinder is arranged vertical in respect to the magnetic field generated by the magnetic poles. A magnetocaloric unit (12) containing seven different magnetocaloric materials (1) to (7) is arranged within the magnetic shielding in form of the hollow cylinder (13). The different magnetocaloric materials (1) to (7) are arranged vertical to the magnetic field lines generated by the two magnetic poles (11a) and (11b). In this special embodiment the magnetocaloric materials are arranged at the rotational axis of the magnetic shielding.

FIG. 1a displays a topview of this embodiment. FIG. 1b shows a lateral view of the inventive magnetocaloric regenerator unit, wherein the magnetic shielding is a first position, i.e. the 7 different magnetocaloric materials (1) to (7) contained in the magnetocaloric unit (12) are insulated by the magnetic shielding (13) from the magnetic field. FIG. 1c shows a lateral view of the inventive magnetocaloric regenerator unit, wherein the magnetic shielding is a second position, i.e. the magnetic field generated between the magnetic poles (11a) and (11b) acts through the two windows (13a) and (13b) in the magnetic shielding (13) on magnetocaloric materials (1) to (7) contained in the magnetocaloric unit (12). In this embodiment of the present invention the magnetocaloric shielding can take two first positions and two second positions, which are attained by successive rotation of the magnetic shielding (13) about 90° about the rotational axis of the magnetic shielding. This embodiment is an especially simple construction which has the advantage that due to the fixed positions of the windows no problems occur due to divergent rotational movement etc. Another advantage is that a high frequency of the variation of the magnetic field is achieved by concurrent low angular frequency of the rotating magnetic shielding when the magnetic shielding has 2 or more windows, since the number of variations of the magnetic field per round increases with the number of windows.

According to another embodiment of the inventive magnetocaloric regenerator unit the magnetocaloric regenerator unit comprises two magnetic shieldings having essentially the form of hollow cylinders of different radii and each hollow cylinder having at least one window in the lateral area of the hollow cylinder; wherein the two hollow cylinders are arranged in parallel one within the other, one pole of the magnetic unit is arranged within the hollow cylinder with the smaller radius, the other pole of the magnetic unit is arranged outside the hollow cylinder with the larger radius; and wherein the magnetocaloric material being arranged within the space between the two hollow cylinders. One example of this embodiment comprising two magnetic shieldings with one window is shown in FIGS. 2a and b, another example of this embodiment comprising two magnetic shieldings with three windows is shown in FIGS. 3a and b.

Figure 2A:
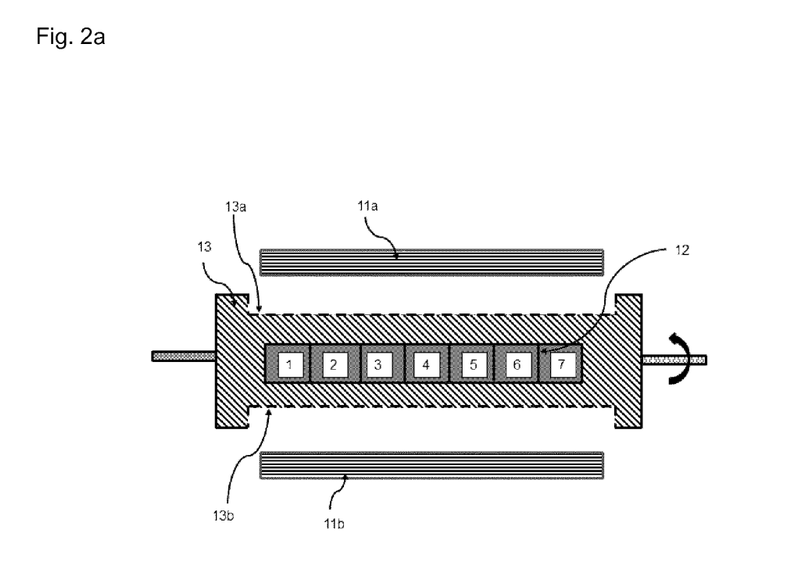
Figure 3A:
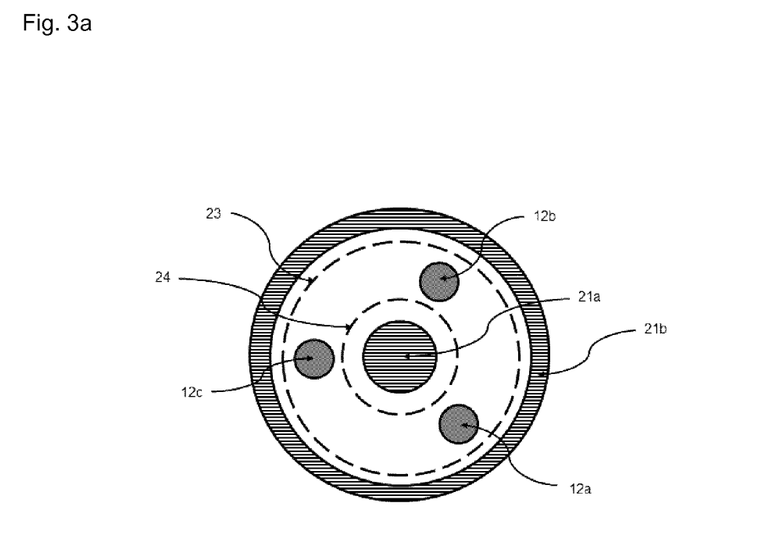

FIGS. 2a and 3a show topviews of two examples of the above described embodiment of the invention. Two magnetic shieldings in form of hollow cylinders having one (FIG. 2a) or three rectangular windows (FIG. 3a) in the lateral area of the hollow cylinders with different radii are provided, the hollow cylinder having the smaller radius (24) is arranged in parallel within the hollow cylinder with the larger radius (23). The two poles (21a, 21b) of the magnetic unit are arranged such, that the first pole (21a) is paced within the hollow cylinder with the smaller radius (24) and the second pole (21b) of the magnet is arranged outside the hollow cylinder with the larger radius (23). The magnetocaloric unit (12a) (FIG. 2a) or the three magnetocaloric material units (12a), (12b) and (12c) (FIG. 3a), respectively, are arranged within the space between the two hollow cylinders (23) and (24). Each magnetocaloric unit (12a), (12b) and (12c) contains 7 different magnetocaloric materials (1) to (7) with different Curie temperatures. The hollow cylinders (23) and (24) are arranged vertical in respect to the magnetic field lines generated by the two magnet poles (21a) and (21b).

Figure 2B:
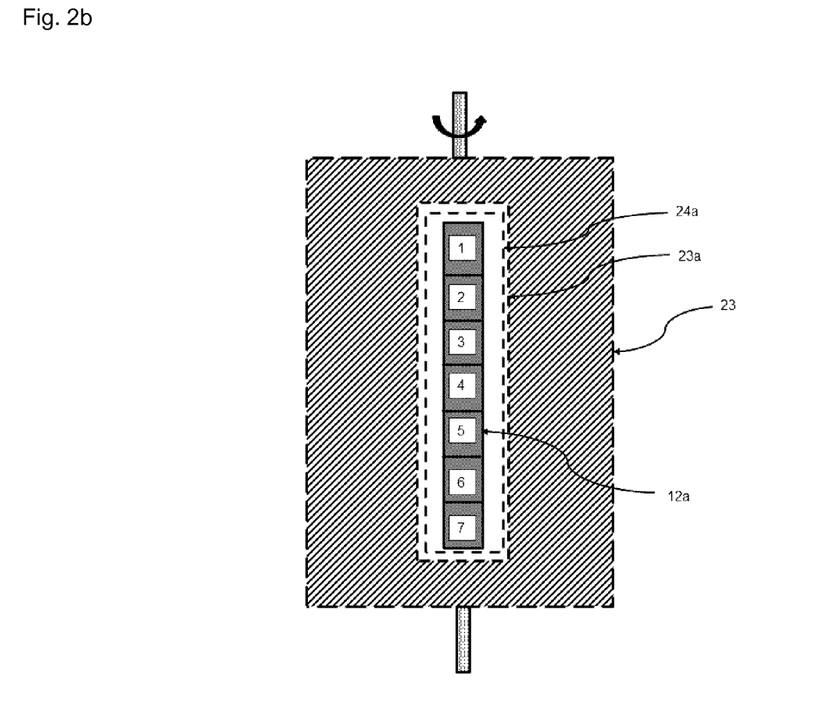
Figure 3B:
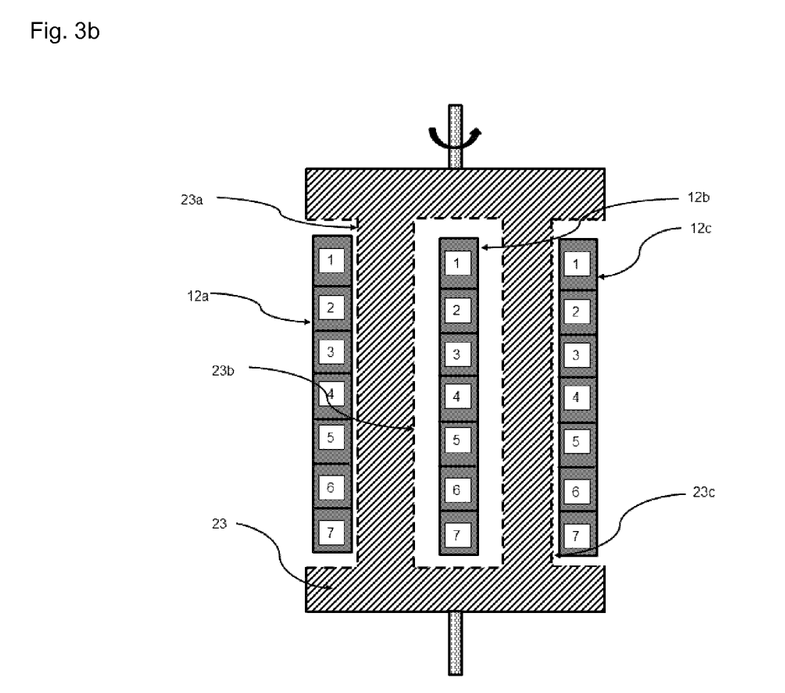

FIGS. 2b and 3b each show a lateral view of inventive magnetocaloric regenerator units, wherein the magnetic shieldings are in a second position without displaying the magnetic poles. According to the example shown in FIG. 2b the magnetic field generated between the magnetic poles (21a) and (21b) acts through the windows (23a) and (24a) on the magnetocaloric materials (1) to (7) contained in the magnetocaloric unit (12a). In this example only one first position exists. According to the example shown in FIG. 3b the magnetic field acts on the magnetocaloric material (1) to (7) contained in the magnetocaloric units (12a), (12b) and (12c) through the six windows in the magnetic shieldings (23) and (24) from which only the three windows (23a), (23b) and (23c) of the outer hollow cylinder are shown. In this example of the present invention the magnetocaloric shielding can take three first positions and three second positions, which are alternating attained by successive concurrent rotation of the magnetic shieldings (23) and (24) about the rotational axis of the magnetic shieldings after every 60° rotation.

This embodiment of the present invention has the advantage that more than one arrangement of magnetocaloric materials, i.e. that more than one magnetocaloric unit can be placed within one magnetic unit leading to a better utilization of the magnetic unit.

According to this embodiment of the present invention the two magnetic shieldings are preferably moved with the same angular frequency to ensure that each shielding will be at the same time in a first position and in a second position, respectively.

In FIGS. 1b, 2b, and 3b the rotational axis for the rotational movement of the magnetic shielding(s) is displayed, too.

In all embodiments of the present invention the area of the at least one window preferably is larger than the area taken by the magnetocaloric material contained within the magnetocaloric material unit when the magnetic shielding is in a second position and it is looked along the magnetic field lines of the magnetic field acting on the magnetocaloric material produced by the magnetic unit. This shape of the window has the advantage that the magnetic field lines are not disturbed or bypassed by the magnetic shielding so that the magnetocaloric material is completely and evenly exposed to the magnetic field.

An important feature for the performance of the magnetocaloric regenerator unit is the heat transfer from and to the magnetocaloric material unit. The heat transfer is preferably performed by a heat transfer medium passing through the magnetocaloric material unit.

The three-dimensional form of the individual different magnetocaloric materials contained in the magnetocaloric material unit can be selected as desired. They may be packed beds of particles of the magnetocaloric materials. Alternatively, they may be stacked plates or shaped bodies which have continuous channels through which the heat exchange medium can flow. Suitable geometries are described below.

A packed bed composed of magnetocaloric material particles is a highly efficient material geometry which allows optimal operation of the magnetocaloric material unit. The individual material particles may have any desired form. The material particles are preferably in spherical form, pellet form, sheet form or cylinder form. The material particles are more preferably in spherical form. The diameter of the material particles, especially of the spheres, is 50 µm to 1 mm, more preferably 200 to 400 µm. The material particles, especially spheres, may have a size distribution. The porosity of the packed bed is preferably in the range from 30 to 45%, more preferably from 36 to 40%. The size distribution is preferably narrow, such that predominantly spheres of one size are present. The diameter preferably differs from the mean diameter by not more than 20%, more preferably by not more than 10%, especially by not more than 5%.

Material particles, especially spheres with the above dimensions, used as a packed bed in the magnetocaloric units give high heat transfer coefficients between solid and a fluid used as heat exchanger fluid, the pressure drop being small to low. This allows an improved coefficient of performance (COP) of the packed bed. The high heat transfer coefficient allows the packed beds to be operated at higher frequencies than customary, and hence allows greater energy extraction.

For the particular operating conditions, the performance of the packed bed can be optimized by using material particles, especially spheres, of different diameter. A lower diameter, especially sphere diameter, leads to a higher coefficient of heat transfer and hence allows better heat exchange. This, however, is associated with a higher pressure drop through the packed bed. Conversely, the use of larger material particles, especially spheres, leads to slower heat transfer, but to lower pressure drops.

The movement resistance of the packed bed of magnetocaloric material can be achieved by any suitable measures. For example, the vessel in which the packed bed of magnetocaloric material(s) is present can be closed on all sides. This can be done, for example, using a mesh cage. In addition, it is possible to join the individual material particles to one another, for example by surface melting of the material particles in the packed bed or by sintering the material particles to one another in the packed bed. The surface melting or sintering should be effected such that the interstices between the material particles are very substantially preserved.

The formation of the packed bed by magnetocaloric material particles in sheet, cylinder, pellet or sphere form or similar form is advantageous, since a large ratio of surface to mass is achieved therewith. This achieves an improved heat transfer rate coupled with relatively low pressure drop.

The magnetocaloric material can be present as shaped body, too. The shaped body may be a block of magnetocaloric material, in which case two opposite end sides of the block have entry and exit orifices for a fluid which are connected by continuous channels which run through the entire monolith. The continuous channels allow a liquid heat transfer medium to flow through, such as water, water/alcohol mixtures, water/salt mixtures or gases such as air or noble gases. Preference is given to using water or water/alcohol mixtures, in which case the alcohol may be a mono- or polyhydric alcohol. For example, the alcohols may be glycols.

If the magnetocaloric material is present in form of a shaped body, the shaped body preferably has continuous channels with a cross-sectional area of the individual channels in the range from 0.001 to 0.2 $mm^2$ and a wall thickness of 50 to 300 µm, a porosity in the range from 10 to 60% and a ratio of surface to volume in the range from 3000 to 50 000 $m^2/m^3$.

Alternatively, the magnetocaloric material unit may comprise or be formed from a plurality of parallel sheets of the different magnetocaloric materials with a sheet thickness of 0.1 to 2 mm, preferably 0.5 to 1 mm, and a plate separation (interstice) of 0.01 to 1 mm, preferably 0.05 to 0.2 mm. The number of sheets may, for example, be 5 to 100, preferably 10 to 50.

The shaped body is produced, for example, by extrusion, injection molding or molding of the magnetocaloric material.

The beds of the individual materials, or stacks of plates or shaped bodies of the individual materials, are combined to give a magnetocaloric material unit, either by bonding them directly to one another or stacking them one on top of another, or separating them from one another by intermediate thermal and/or electrical insulators.

The different magnetocaloric materials with different Curie temperatures contained in the magnetocaloric material unit may be selected from any suitable magnetocaloric materials. In the meantime a wide variety of possible magnetocaloric materials and their preparation are known to the person skilled in the art.

The magnetocaloric cascades may be prepared by a process, which comprises subjecting powders of the particular magnetocaloric materials to shaping to form the magnetocaloric materials and subsequently packing the magnetocaloric materials to form the magnetocaloric cascade.

Preferred magnetocaloric materials for use in the inventive magnetocaloric regenerator unit are selected from
(1) compounds of the general formula (I)

$$(A_yB_{1-y})_{2+d}C_wD_xE_z \qquad (I)$$

where
A: is Mn or Co,
B: is Fe, Cr or Ni,
C, D and E: at least two of C, D and E are different, have a non-vanishing concentration and are selected from P, B, Se, Ge, Ga, Si, Sn, N, As and Sb, where at least one of C, D and E is Ge, As or Si,
d: is a number in the range from −0.1 to 0.1,
w, x, y, z: are numbers in the range from 0 to 1, where w+x+z=1;
(2) La- and Fe-based compounds of the general formulae (II) and/or (III) and/or (IV)

$$La(Fe_xAl_{1-x})_{13}H_y \text{ or } La(Fe_xSi_{1-x})_{13}H_y \qquad (II)$$

where
x: is a number from 0.7 to 0.95,
y: is a number from 0 to 3, preferably from 0 to 2;

$$La(Fe_xAl_yCo_z)_{13} \text{ or } La(Fe_xSi_yCo_z)_{13} \qquad (III)$$

where
x: is a number from 0.7 to 0.95,
y: is a number from 0.05 to 1−x,
z: is a number from 0.005 to 0.5; and $$LaMn_xFe_{2-x}Ge \qquad (IV)$$

where
x: is a number from 1.7 to 1.95;
(3) Heusler alloys of the $MnT_tT_p$ type where $T_t$ is a transition metal and $T_p$ is a p-doping metal having an electron count per atom e/a in the range from 7 to 8.5;
(4) Gd- and Si-based compounds of the general formula (V)

$$Gd_5(Si_xGe_{1-x})_4 \qquad (V)$$

where x is a number from 0.2 to 1;
(5) $Fe_2P$-based compounds;
(6) manganites of the perovskite type;
(7) compounds which comprise rare earth elements and are of the general formulae (VI) and (VII)

$$Tb_5(Si_{4-x}Ge_x) \qquad (VI)$$

where x: is 0, 1, 2, 3, 4;

$$XTiGe \qquad (VII)$$

where X: is Dy, Ho, Tm; and
(8) Mn- and Sb- or As-based compounds of the general formulae (VIII), (IX), (X), and (XI)

$$Mn_{2-x}Z_xSb \qquad (VIII)$$

$$Mn_2Z_xSb_{1-x} \qquad (IX)$$

where
Z: is Cr, Cu, Zn, Co, V, As, Ge,
x: is from 0.01 to 0.5, $$Mn_{2-x}Z_xAs \qquad (X) \text{ and}$$

$$Mn_2Z_xAs_{1-x} \qquad (XI)$$

where
Z: is Cr, Cu, Zn, Co, V, Sb, Ge,
x: is from 0.01 to 0.5.
It has been found in accordance with the invention that the aforementioned magnetocaloric materials can be used advantageously in the inventive magnetocaloric regenerator.

Particular preference is given in accordance with the invention to the metal-based materials selected from compounds (1), (2) and (3), and also (5).

Materials particularly suitable in accordance with the invention are described, for example, in WO 2004/068512 A1, Rare Metals, Vol. 25, 2006, pages 544 to 549, J. Appl. Phys. 99,08Q107 (2006), Nature, Vol. 415, Jan. 10, 2002, pages 150 to 152 and Physica B 327 (2003), pages 431 to 437.

Magnetocaloric materials of general formula (I) are described in WO 2004/068512 A1 and WO 2003/012801 A1. Preference is given to magnetocaloric materials selected from at least quaternary compounds of the general formula (I) wherein C, D and E are preferably identical or different and are selected from at least one of P, As, Ge, Si, Sn and Ga. More preferred are magnetocaloric materials selected from at least quaternary compounds of the general formula (I) which, as well as Mn, Fe, P and optionally Sb, additionally comprise Ge or Si or As or both Ge and Si or both Ge and As or both Si and As, or each of Ge, Si and As. The material preferably has the general formula $MnFe(P_wGe_xSi_z)$ wherein x is preferably a number in the range from 0.3 to 0.7, w is less than or equal to 1−x and z corresponds to 1−x−w. The material preferably has the crystalline hexagonal $Fe_2P$ structure. Examples of suitable materials are $MnFeP_{0.45\ to\ 0.7}Ge_{0.55\ to\ 0.30}$ and $MnFeP_{0.5\ to\ 0.70}(Si/Ge)_{0.5\ to\ 0.30}$. (Si/Ge) means, that only one of Si and Ge may be present or both.

Also preferred at least 90% by weight, more preferably at least 95% by weight, of component A is Mn. More preferably at least 90% by weight, more preferably at least 95% by weight, of B is Fe. Preferably at least 90% by weight, more preferably at least 95% by weight, of C is P. Preferably at least 90% by weight, more preferably at least 95% by weight, of D is Ge. Preferably at least 90% by weight, more preferably at least 95% by weight, of E is Si.

Suitable compounds are additionally $Mn_{1+x}Fe_{1-x}P_{1-y}Ge_y$ with x in the range from −0.3 to 0.5, y in the range from 0.1 to 0.6. Likewise suitable are compounds of the general formula $Mn_{1+x}Fe_{1-x}P_{1-y}Ge_{y-z}Sb_z$ with x in the range from −0.3 to 0.5, y in the range from 0.1 to 0.6 and z less than y and less than 0.2. Also suitable are compounds of the formula $Mn_{1+x}Fe_{1-x}P_{1-y}Ge_{y-z}Si_z$ with x in the range from 0.3 to 0.5, y in the range from 0.1 to 0.66, z less than or equal to y and less than 0.6.

Especially useful magnetocaloric materials of general formula (I) exhibiting a small thermal hysteresis of the magnetic phase transition are described in WO 2011/111004 and WO 2011/083446 having the general formula $$(Mn_xFe_{1-x})_{2+z}P_{1-y}Si_y$$

where
0.20≤x≤0.40
0.4≤y≤0.8
−0.1≤z≤0.1
or
0.55≤x<1
0.4≤y≤0.8
−0.1≤z≤0.1.
Suitable $Fe_2P$-based compounds originate from $Fe_2P$ and $FeAs_2$, and obtain optionally Mn and P. They correspond, for example, to the general formulae $MnFe_{1-x}Co_xGe$, where x=0.7-0.9, $Mn_{5-x}Fe_xSi_3$ where x=0-5, $Mn_5Ge_{3-x}Si_x$ where x=0.1-2, $Mn_5Ge_{3-x}Sb_x$ where x=0-0.3, $Mn_{2-x}Fe_xGe_2$ where x=0.1-0.2, $Mn_{3-x}Co_xGaC$ where x=0-0.05. A description of magnetocaloric $Fe_2P$-based compounds may be found in E. Brueck et al., J. Alloys and Compounds 282 (2004), pages 32 to 36.

Preferred La- and Fe-based compounds of the general formulae (II) and/or (III) and/or (IV) are $La(Fe_{0.90}Si_{0.10})_{13}$, $La(Fe_{0.89}Si_{0.11})_{13}$, $La(Fe_{0.880}Si_{0.120})_{13}$, $La(Fe_{0.877}Si_{0.123})_{13}$, $LaFe_{11.8}Si_{1.2}$, $La(Fe_{0.88}Si_{0.12})_{13}H_{0.5}$, $La(Fe_{0.88}Si_{0.12})_{13}H_{1.0}$, $LaFe_{11.7}Si_{1.3}H_{1.1}$, $LaFe_{11.57}Si_{1.43}H_{1.3}$, $La(Fe_{0.88}Si_{0.12})H_{1.5}$, $LaFe_{11.2}Co_{0.7}Si_{1.1}$, $LaFe_{11.5}Al_{1.5}Co_{0.1}$, $LaFe_{11.5}Al_{1.5}Co_{0.2}$, $LaFe_{11.5}Al_{1.5}Co_{0.4}$, $LaFe_{11.5}Al_{1.5}Co_{0.5}$, $La(Fe_{0.94}Co_{0.06})_{11.83}Al_{1.17}$, $La(Fe_{0.92}Co_{0.08})_{11.83}Al_{1.17}$.

Suitable manganese-comprising compounds are MnFeGe, $MnFe_{0.9}Co_{0.1}Ge$, $MnFe_{0.8}Co_{0.2}Ge$, $MnFe_{0.7}Co_{0.3}Ge$, $MnFe_{0.6}Co_{0.4}Ge$, $MnFe_{0.5}Co_{0.5}Ge$, $MnFe_{0.4}Co_{0.6}Ge$, $MnFe_{0.3}Co_{0.7}Ge$, $MnFe_{0.2}Co_{0.8}Ge$, $MnFe_{0.15}Co_{0.85}Ge$, $MnFe_{0.1}Co_{0.9}Ge$, $MnCoGe$, $Mn_5Ge_{2.5}Si_{0.5}$, $Mn_5Ge_2Si$, $Mn_5Ge_{1.5}Si_{1.5}$, $Mn_5GeSi_2$, $Mn_5Ge_3$, $Mn_5Ge_{2.9}Sb_{0.1}$, $Mn_5Ge_{2.8}Sb_{0.2}$, $Mn_5Ge_{2.7}Sb_{0.3}$, $LaMn_{1.9}Fe_{0.1}Ge$, $LaMn_{1.85}Fe_{0.15}Ge$, $LaMn_{1.8}Fe_{0.2}Ge$, $(Fe_{0.9}Mn_{0.1})_3C$, $(Fe_{0.8}Mn_{0.2})_3C$, $(Fe_{0.7}Mn_{0.3})_3C$, $Mn_3GaC$, MnAs, (Mn,Fe)As, $Mn_{1+\delta}As_{0.8}Sb_{0.2}$, $MnAs_{0.75}Sb_{0.25}$, $Mn_{1.1}As_{0.75}Sb_{0.25}$, $Mn_{1.5}As_{0.75}Sb_{0.25}$.

Heusler alloys suitable in accordance with the invention are, for example, $Ni_2MnGa$, $Fe_2MnSi_{1-x}Ge_x$ with x=0-1 such as $Fe_2MnSi_{0.5}Ge_{0.5}$, $Ni_{52.9}Mn_{22.4}Ga_{24.7}$, $Ni_{50.9}Mn_{24.7}Ga_{24.4}$, $Ni_{55.2}Mn_{18.6}Ga_{26.2}$, $Ni_{51.6}Mn_{24.7}Ga_{23.8}$, $Ni_{52.7}Mn_{23.9}Ga_{23.4}$, CoMnSb, $CoNb_{0.2}Mn_{0.8}Sb$, $CoNb_{0.4}Mn_{0.6}SB$, $CoNb_{0.6}Mn_{0.4}Sb$, $Ni_{50}Mn_{35}Sn_{15}$, $Ni_{50}Mn_{37}Sn_{13}$, $MnFeP_{0.45}As_{0.55}$, $MnFeP_{0.47}As_{0.53}$, $Mn_{1.1}Fe_{0.9}P_{0.47}As_{0.53}$, $MnFeP_{0.89-x}Si_xGe_{0.11}$, X=0.22, X=0.26, X=0.30, X=0.33.

Additionally suitable are $Fe_{90}Zr_{10}$, $Fe_{82}Mn_8Zr_{10}$, $Co_{66}Nb_9Cu_1Si_{12}B_{12}$, $Pd_{40}Ni_{22.5}Fe_{17.5}P_{20}$, FeMoSiBCuNb, $Gd_{70}Fe_{30}$, GdNiAl, $NdFe_{12}B_6GdMn_2$.

Manganites of the perovskite type are, for example, $La_{0.6}Ca_{0.4}MnO_3$, $La_{0.67}Ca_{0.33}MnO_3$, $La_{0.8}Ca_{0.2}MnO_3$, $La_{0.7}Ca_{0.3}MnO_3$, $La_{0.958}Li_{0.025}Ti_{0.1}Mn_{0.9}O_3$, $La_{0.65}Ca_{0.35}Ti_{0.1}Mn_{0.9}O_3$, $La_{0.799}Na_{0.199}MnO_{2.97}$, $La_{0.88}Na_{0.099}Mn_{0.977}O_3$, $La_{0.877}K_{0.096}Mn_{0.974}O_3$, $La_{0.65}Sr_{0.35}Mn_{0.95}Cn_{0.05}O_3$, $La_{0.7}Nd_{0.1}Na_{0.2}MnO_3$, $La_{0.5}Ca_{0.3}Sr_{0.2}MnO_3$.

Heusler alloys of the $MnT_tT_p$ type where $T_t$ is a transition metal and $T_p$ is a p-doping metal having an electron count per atom e/a in the range from 7 to 8.5 described are described in Krenke et al., Physical review B72, 014412 (2005).

Gd- and Si-based compounds of the general formula (V)

$$Gd_5(Si_xGe_{1-x})_4$$

where x is a number from 0.2 to 1 are, for example, $Gd_5(Si_{0.5}Ge_{0.5})_4$, $Gd_5(Si_{0.425}Ge_{0.575})_4$, $Gd_5(Si_{0.45}Ge_{0.55})_4$, $Gd_5(Si_{0.365}Ge_{0.635})_4$, $Gd_5(Si_{0.3}Ge_{0.7})_4$, $Gd_5(Si_{0.25}Ge_{0.75})_4$.

Compounds comprising rare earth elements are $Tb_5(Si_{4-x}Ge_x)$ with x=0, 1, 2, 3, 4 or XTiGe with X=Dy, Ho, Tm, for example $Tb_5Si_4$, $Tb_5(Si_3Ge)$, $Tb(Si_2Ge_2)$, $Tb_5Ge_4$, DyTiGe, HoTiGe, TmTiGe.

Mn- and Sb- or As-based compounds of the general formulae (VIII) to (XI) preferably have the definitions of z=0.05 to 0.3, Z=Cr, Cu, Ge, Co.

The magnetocaloric materials used in accordance with the invention can be produced in any suitable manner.

The magnetocaloric materials are produced, for example, by solid phase reaction of the starting elements or starting alloys for the material in a ball mill, subsequent pressing, sintering and heat treatment under inert gas atmosphere and subsequent slow cooling to room temperature. Such a process is described, for example, in J. Appl. Phys. 99, 2006, 08Q107.

Processing via melt spinning is also possible. This makes possible a more homogeneous element distribution which leads to an improved magnetocaloric effect; cf. Rare Metals, Vol. 25, October 2006, pages 544 to 549. In the process described there, the starting elements are first induction-melted in an argon gas atmosphere and then sprayed in the molten state through a nozzle onto a rotating copper roller. There follows sintering at 1000° C. and slow cooling to room temperature.

In addition, reference may be made to WO 2004/068512 A1 for the production. However, the materials obtained by these processes frequently exhibit high thermal hysteresis. For example, in compounds of the $Fe_2P$ type substituted by germanium or silicon, large values for thermal hysteresis are observed within a wide range of 10 K or more.

The thermal hysteresis can be reduced significantly and a large magnetocaloric effect can be achieved when the metal-based materials are not cooled slowing to ambient temperature after the sintering and/or heat treatment, but rather are quenched at a high cooling rate. This cooling rate is at least 100 K/s. The cooling rate is preferably from 100 to 10 000 K/s, more preferably from 200 to 1300 K/s. Especially preferred cooling rates are from 300 to 1000 K/s.

The quenching can be achieved by any suitable cooling processes, for example by quenching the solid with water or aqueous liquids, for example cooled water or ice/water mixtures. The solids can, for example, be allowed to fall into ice-cooled water. It is also possible to quench the solids with subcooled gases such as liquid nitrogen. Further processes for quenching are known to those skilled in the art. What is advantageous here is controlled and rapid cooling.

The rest of the production of the magnetocaloric materials is less critical, provided that the last step comprises the quenching of the sintered and/or heat-treated solid at the inventive cooling rate.

A further aspect of the present invention refers to the use of at least one magnetic shielding comprising at least one window as described above for operating a magnetocaloric device containing at least one magnetocaloric material by varying the magnetic field used to exploit the magnetocaloric effect by moving the at least one magnetic shielding between at least one first position and at least one second position thereby insulating the magnetocaloric material contained in the magnetocaloric material unit from the magnetic field as the magnetic shielding is in a first position and allowing the magnetic field to act on the magnetocaloric material through the at least one window as the magnetic shielding is in a second position.

Another aspect of the present invention is a process of operating a magnetocaloric device containing at least one magnetocaloric material wherein the varying magnetic field used to exploit the magnetocaloric effect is produced by moving at least one magnetic shielding comprising at least one window as described above between at least one first position and at least one second position thereby insulating the magnetocaloric material contained in the magnetocaloric material unit from the magnetic field as the magnetic shielding is in a first position and allowing the magnetic field to act on the magnetocaloric material through the at least one window as the magnetic shielding is in a second position.

The inventive magnetocaloric regenerators are preferably used in refrigeration systems like fridges, freezers and wine coolers, climate control units including air condition, and heat pumps. The present invention therefore provides refrigeration systems like fridges, freezers and wine coolers, climate control units including air condition, and heat pumps comprising an inventive magnetocaloric regenerator unit as described above.

The invention claimed is:

1. A magnetocaloric regenerator unit, comprising:
   (A) at least one magnetocaloric material unit having a higher temperature hot side and a lower temperature cold side during operation, wherein the magnetocaloric material unit contains at least one magnetocaloric material, (B) at least one magnetic unit for producing a magnetic field over the magnetocaloric material contained in the magnetocaloric material unit, (C) at least one magnetic shielding comprising at least one window wherein the at least one magnetic shielding is mounted flexible to allow movement of the magnetic shielding between at least one first position and at least one second position thereby insulating the magnetocaloric material contained in the magnetocaloric material unit from the magnetic field when the magnetic shielding is in a first position and allowing the magnetic field to act on the magnetocaloric material through the at least one window when the magnetic shielding is in a second position, wherein (D) the magnetic shielding comprises at least one soft magnetic material selected from pure iron; iron-silicon alloys; iron-cobalt alloys; nickel alloys comprising nickel and at least one element selected from iron, copper, cobalt, molybdenum, chromium and manganese like permalloy, supermalloy and mu-metal; amorphous nickel-iron based alloys and amorphous cobalt-based alloys, and wherein (E) the magnetic shielding comprises at least one layer of a first soft magnetic material and at least one layer of a second soft magnetic material achieving a saturation level at a higher value of the magnetic field than the first soft magnetic material.

2. The magnetocaloric regenerator unit according to claim 1, wherein the at least one magnetocaloric material unit contains at least 2 up to 100 different magnetocaloric materials with different Curie temperatures, which are arranged in succession by descending Curie temperature.

3. The magnetocaloric regenerator unit according to claim 2, wherein the difference in the Curie temperatures of adjacent magnetocaloric materials is 0.5 to 6° K.

4. The magnetocaloric regenerator unit according to claim 1, wherein the magnetic field produced by the magnetic unit is in the range of from 0.5 to 2.5 T.

5. The magnetocaloric regenerator unit according to claim 1, herein the magnetic shielding reduces the magnetic field produced by the magnetic unit by at least 90% when the magnetic shielding is in a first position.

6. The magnetocaloric regenerator unit according to claim 1, wherein the magnetic shielding is mounted flexible to allow rotational or lateral movement of the magnetic shielding.

7. The magnetocaloric regenerator unit according to claim 1 wherein the magnetic shielding has essentially the form of a hollow body.

8. The magnetocaloric regenerator unit according to claim 1, wherein the magnetic shielding comprises at least two windows for allowing the magnetic field produced by the magnetic unit to act on the magnetocaloric material if the magnetic shielding is in a second position.

9. The magnetocaloric regenerator unit according to claim 1, wherein the area of the at least one window is larger than the area taken by the magnetocaloric material contained within the magnetocaloric material unit when the magnetic shielding is in a second position and it is looked along the magnetic field lines of the magnetic field acting on the magnetocaloric material produced by the magnetic unit.

10. The magnetocaloric regenerator unit according to claim 1 wherein the magnetic shielding has essentially the form of a hollow cylinder with at least two windows on opposing sides in the lateral area of the hollow cylinder; wherein the magnetocaloric material is arranged within the hollow cylinder; and wherein the magnetic shielding together with the magnetocaloric material is arranged within the magnetic field produced by the magnetic unit.

11. The magnetocaloric regenerator unit according to claim 1, wherein the magnetocaloric regenerator unit comprises two magnetic shieldings having essentially the form of hollow cylinders of different radii and each hollow cylinder having at least one window in the lateral area of the hollow cylinder; wherein the two hollow cylinders are arranged in parallel one within the other, one pole of the magnetic unit is arranged within the hollow cylinder with the smaller radius, the other pole of the magnetic unit is arranged outside the hollow cylinder with the larger radius; and wherein the magnetocaloric material being arranged within the space between the two hollow cylinders.

12. A process of operating a magnetocaloric device containing at least one magnetocaloric material, said process comprising:

producing a varying magnetic field used to exploit the magnetocaloric effect by moving at least one magnetic shielding comprising at least one window between at least one first position and at least one second position thereby insulating the magnetocaloric material contained in the magnetocaloric material unit from the magnetic field when the magnetic shielding is in a first position and allowing the magnetic field to act on the magnetocaloric material through the at least one window when the magnetic shielding is in a second position, wherein the magnetic shielding comprises at least one soft magnetic material selected from pure iron; iron-silicon alloys; iron-cobalt alloys; nickel alloys comprising nickel and at least one element selected from iron, copper, cobalt, molybdenum, chromium and manganese like permalloy, supermalloy and mu-metal; amorphous nickel-iron-based alloys and amorphous cobalt-based alloys, and wherein the magnetic shielding comprises at least one layer of a first soft magnetic material and at least one layer of a second soft magnetic material achieving a saturation level at a higher value of the magnetic field than the first soft magnetic material.

13. A refrigeration system, a climate control unit, or a heat pump, respectively comprising a magnetocaloric regenerator unit according to claim 1.

* * * * *